(12) United States Patent
Jenkins

(10) Patent No.: US 9,108,369 B2
(45) Date of Patent: Aug. 18, 2015

(54) WEDGE LIGHT GUIDE

(75) Inventor: Kurt Allen Jenkins, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 632 days.

(21) Appl. No.: 13/190,198

(22) Filed: Jul. 25, 2011

(65) Prior Publication Data

US 2013/0028558 A1    Jan. 31, 2013

(51) Int. Cl.
| | |
|---|---|
| *G02B 6/26* | (2006.01) |
| *G02F 1/1333* | (2006.01) |
| *G06F 3/041* | (2006.01) |
| *B29D 11/00* | (2006.01) |
| *B29C 33/00* | (2006.01) |
| *B29C 45/27* | (2006.01) |
| *F21V 8/00* | (2006.01) |
| *B29L 11/00* | (2006.01) |

(52) U.S. Cl.
CPC ............ *B29D 11/0075* (2013.01); *B29C 33/00* (2013.01); *B29C 45/2708* (2013.01); *B29D 11/0048* (2013.01); *G02B 6/0046* (2013.01); *B29C 2045/2714* (2013.01); *B29L 2011/0075* (2013.01); *G02B 6/0028* (2013.01); *G02B 6/0036* (2013.01); *G02B 6/0038* (2013.01); *G02B 6/0045* (2013.01); *G02B 6/0048* (2013.01)

(58) Field of Classification Search
CPC .. G02B 6/0045; G02B 6/0046; G02B 6/0048; G02B 6/0036; G02B 6/0038; G02B 6/0028
USPC ............... 385/31, 34–37, 39; 349/56–68; 345/173–179
See application file for complete search history.

(56) References Cited

U.S. PATENT DOCUMENTS

| | | | |
|---|---|---|---|
| 5,861,990 A | 1/1999 | Tedesco | |
| 6,746,130 B2 * | 6/2004 | Ohkawa | 362/617 |
| 6,976,779 B2 * | 12/2005 | Ohtsuki et al. | 362/608 |
| 6,979,095 B2 * | 12/2005 | Min et al. | 362/611 |
| 7,218,830 B2 * | 5/2007 | Iimura | 385/146 |
| 7,278,775 B2 * | 10/2007 | Yeo et al. | 362/627 |
| 7,616,368 B2 | 11/2009 | Hagood, IV | |
| 7,873,257 B2 | 1/2011 | Morgan | |
| 7,910,035 B2 | 3/2011 | Gibson et al. | |
| 7,925,129 B2 | 4/2011 | Ghosh et al. | |
| 7,991,257 B1 * | 8/2011 | Coleman | 385/129 |
| 8,073,303 B2 * | 12/2011 | Whang et al. | 385/146 |
| 8,134,132 B2 * | 3/2012 | Middlemass et al. | 250/455.11 |

(Continued)

OTHER PUBLICATIONS

Travis, et al., "Collimated light from a waveguide for a display backlight", Retrieved at <<http://download.microsoft.com/download/D/2/E/D2E425F8-CF3C-4C71-A4A2-70F9D4081007/OpticsExpressbacklightpaper.pdf>>, vol. 17, No. 22, Oct. 26, 2009, pp. 6.

*Primary Examiner* — Ryan Lepisto
*Assistant Examiner* — Guy Anderson
(74) *Attorney, Agent, or Firm* — Jeremy Snodgrass; Judy Yee; Micky Minhas

(57) ABSTRACT

In one or more embodiments, wedge light guides are constructed that are monolithic in nature and include integrally-formed optical concentrators. The wedge light guide and its associated optical concentrators are defined by a mold. In at least some embodiments, structure within the mold that defines the optical concentrators can be used as injection ports through which formation material can be injected to form the monolithic wedge light guide.

20 Claims, 7 Drawing Sheets

(56) References Cited

U.S. PATENT DOCUMENTS

| | | | |
|---|---|---|---|
| 2003/0058381 A1* | 3/2003 | Shinohara et al. | 349/63 |
| 2004/0170011 A1* | 9/2004 | Kim et al. | 362/31 |
| 2005/0068759 A1* | 3/2005 | Takemoto et al. | 362/31 |
| 2006/0274051 A1* | 12/2006 | Longe et al. | 345/173 |
| 2007/0081728 A1* | 4/2007 | Park et al. | 382/190 |
| 2007/0222092 A1 | 9/2007 | Hayashi et al. | |
| 2009/0161364 A1* | 6/2009 | Bremerich et al. | 362/268 |
| 2009/0284471 A1* | 11/2009 | Longe et al. | 345/168 |
| 2010/0053771 A1* | 3/2010 | Travis et al. | 359/726 |
| 2010/0091254 A1* | 4/2010 | Travis et al. | 353/99 |
| 2010/0108133 A1* | 5/2010 | Bhagavatula et al. | 136/256 |
| 2010/0148384 A1 | 6/2010 | Jenkins | |
| 2010/0214270 A1* | 8/2010 | Lai et al. | 345/175 |
| 2010/0231498 A1* | 9/2010 | Large et al. | 345/102 |
| 2010/0238138 A1* | 9/2010 | Goertz et al. | 345/175 |
| 2010/0238139 A1* | 9/2010 | Goertz et al. | 345/175 |
| 2010/0259804 A1* | 10/2010 | Buschbeck et al. | 359/34 |
| 2011/0049736 A1 | 3/2011 | Jenkins | |
| 2011/0277361 A1* | 11/2011 | Nichol et al. | 40/541 |
| 2011/0286222 A1* | 11/2011 | Coleman | 362/326 |

* cited by examiner

WEDGE LIGHT GUIDE

BACKGROUND

Light guides are wave guides configured to guide visible light between two interfaces via total internal reflection. One type of light guide comprises a wedge-like structure, also termed a wedge light guide, configured to direct light between an interface located at one side edge of the wedge and another interface located at a major face of the wedge. Light that enters the wedge at the side edge interface is internally reflected until reaching a certain angle relative to the interface at the major surface. This allows a relatively small image projected at the side edge interface to be displayed as a relatively larger image on the major face interface of the wedge.

Wedge light guides can utilize special ports called optical concentrators. Optical concentrators are utilized to inject light into the wedge light guide and can be designed to reduce light loss over short distances. Typically, a wedge light guide is first constructed and then, after constructed, optical concentrators are physically mounted on, or otherwise affixed to the wedge light guide. Because of design and operability considerations, placement of the optical concentrators utilizes a high degree of precision.

Using wedge light guides, flat panel displays, such as backlit liquid crystal displays (LCDs) and other imaging-based devices can be designed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more embodiments, wedge light guides are constructed that are monolithic in nature and include integrally-formed optical concentrators. The wedge light guide and its associated optical concentrators are defined by a mold. In at least some embodiments, structure within the mold that defines the optical concentrators can be used as injection ports through which formation material can be injected to form the monolithic wedge light guide.

BRIEF DESCRIPTION OF THE DRAWINGS

The detailed description is described with reference to the accompanying figures.

DETAILED DESCRIPTION

Overview

In one or more embodiments, wedge light guides are constructed that are monolithic in nature and include integrally-formed optical concentrators. The monolithic wedge light guide defines a uniform, continuous and unbroken structure that is contemporaneously formed. The wedge light guide and its associated optical concentrators are defined by a mold. In at least some embodiments, structure within the mold that defines the optical concentrators can be used as injection ports through which formation material can be injected to form the monolithic wedge light guide. Constructing wedge light guides as described below can allow for the uniform flow of formation material and reduce or eliminate secondary parts while, at the same time, improving optical quality of the wedge light guide. For example, a suitably-configured mold can reduce or eliminate registration problems associated with separately forming the optical concentrators and subsequently mounting them to a wedge light guide body.

In the following discussion, an example environment is first described that is operable to employ the techniques described herein. Next, a section entitled "Forming Wedge Light Guides" describes various examples of how wedge light guides can be formed in accordance with one or more embodiments. Following this, a section entitled "Example Wedge Light Guide" describes an example monolithic wedge light guide in accordance with one or more embodiments. Last, section entitled "Example Method" describes an example method in accordance with one or more embodiments.

Having considered an overview of the embodiments about to be described, consider now a discussion of an example environment in which various embodiments can operate.

Example Environment

Figure 1:
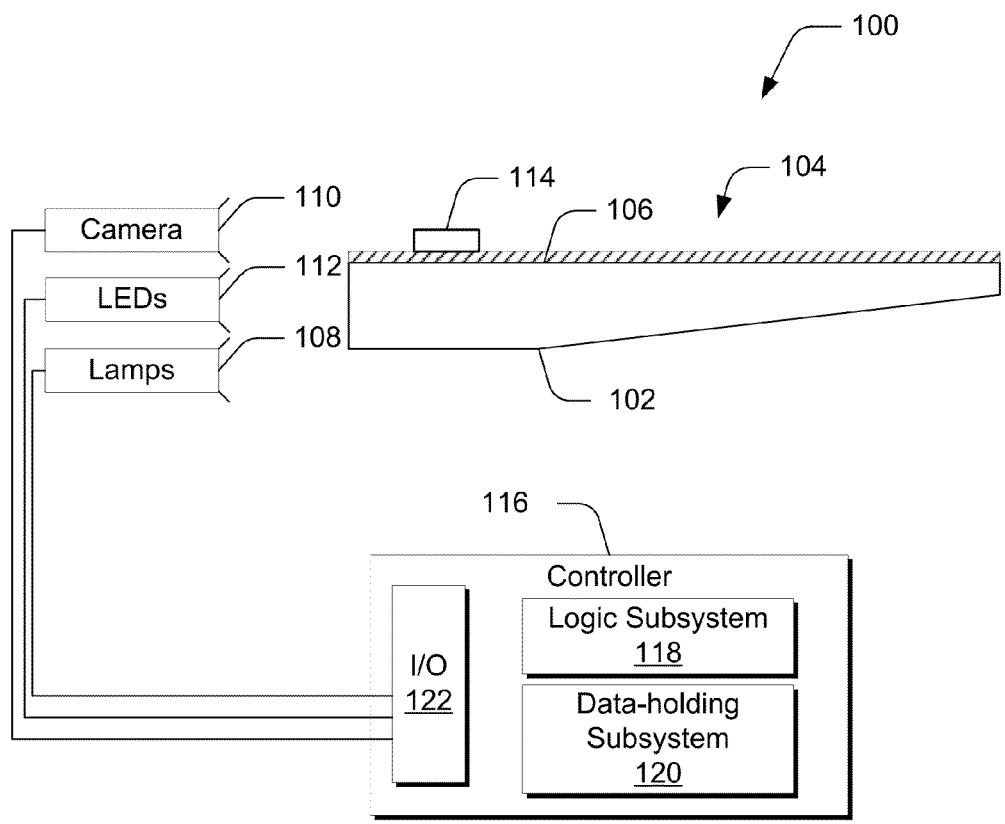
FIG. 1 is an illustration of an environment in an example implementation in accordance with one or more embodiments.

FIG. 1 is an illustration of an environment 100 in an example implementation of a surface computing device that is operable to employ the techniques as described herein.

As noted above, a wedge light guide may be used to provide light (e.g. backlighting or a projected image) to a surface computing device. Surface computing device 100 includes a wedge light guide 102 and a display surface 104 positioned operably adjacent the wedge light guide and comprising a liquid crystal display (LCD) panel 106 configured to provide an image to the display surface. The LCD panel 106 may have any suitable size and aspect ratio and may be formed from any suitable material. For example, in some embodiments, the LCD panel 106 has a screen diagonal of 32", 37", 42", or 46" and comprises a 16:9 aspect ratio.

Typically, an image is provided onto the display surface via light entering at the thick end of the wedge light guide through optical concentrators (not specifically shown). Alternately or additionally, light can enter the thin end of the wedge light guide through optical concentrators located thereon. Light rays fan out as they travel through the wedge light guide until they reach a critical angle at which the rays emerge from one side collimated in a single direction. A magnified image can thus be rendered on display surface 104. It is to be appreciated and understood that the techniques described herein can be applied to both configurations of wedge light guides, i.e., those with light entering through optical concentrators located at the thick end of the guide, and those with light entering through optical concentrators located at the thin end of the guide.

The computing device of environment 100 further comprises a backlight system that includes wedge light guide 102. The backlight system is configured to provide light to the LCD panel 106. The backlight system comprises one or more light sources for the wedge light guide, such as the depicted lamp 108. Any number of lamps can be utilized, as will be appreciated by the skilled artisan. Lamp 108 can be utilized for delivery of backlight to the LCD panel 106. It will be understood that any other suitable light source other than lamps may be used, including but not limited to light emitting diode arrays, and the like. Further, it will be understood that, in other embodiments, the backlight system may comprise a plurality of individual wedge light guides arranged in a side-by-side manner. It will also be understood that the delivery of backlighting may be considered "delivery of an image" and the like as used herein.

The surface computing device of environment 100 further comprises, in at least some embodiments, a vision-based, touch-detection system that comprises a camera 110 and an infrared light source, such as infrared light emitting diodes 112. The infrared light emitting diodes 112 are configured to introduce infrared light into the wedge light guide. Any objects placed on the display surface 104, such as object 114, will reflect infrared light from the light emitting diodes 112. This light may then be detected via camera 110 to thereby allow the vision-based detection of objects touching the display surface 104.

The computing device of environment 100 also comprises a controller 116 configured to control the various components of the computing device. The controller, in the presently-described embodiment, includes a logic subsystem 118, a data holding subsystem 120 operatively coupled to the logic subsystem 118 and an input/output port (I/O) system 122.

Logic subsystem 118 is configured to execute one or more instructions that are part of one or more programs, routines, objects, components, data structures, or other logical constructs. The logic subsystem 118 may include one or more processors that are configured to execute software instructions. Additionally or alternatively, the logic subsystem 118 may include one or more hardware or firmware logic machines configured to execute hardware or firmware instructions. The logic subsystem 118 may optionally include individual components that are distributed throughout two or more devices, which may be remotely located in some embodiments.

Data-holding subsystem 120 may include one or more components configured to hold data and/or instructions executable by the logic subsystem 118. Data-holding subsystem 120 may include removable media and/or built-in devices, optical memory devices, semiconductor memory devices, magnetic memory devices, etc., and may include memory with one or more of the following characteristics: volatile, nonvolatile, dynamic, static, read/write, read-only, random access, sequential access, location addressable, file addressable, and content addressable.

In some embodiments, logic subsystem 118 and data-holding subsystem 120 may be integrated into one or more common devices, such as an application specific integrated circuit or a system on a chip.

Controller 116 controls lamps 108, LEDs 112, and camera 110, as well as other components of the computing device via an I/O module 122. The system of FIG. 1 can be used in connection with or comprise part of any suitable type of computing device.

Figure 2:
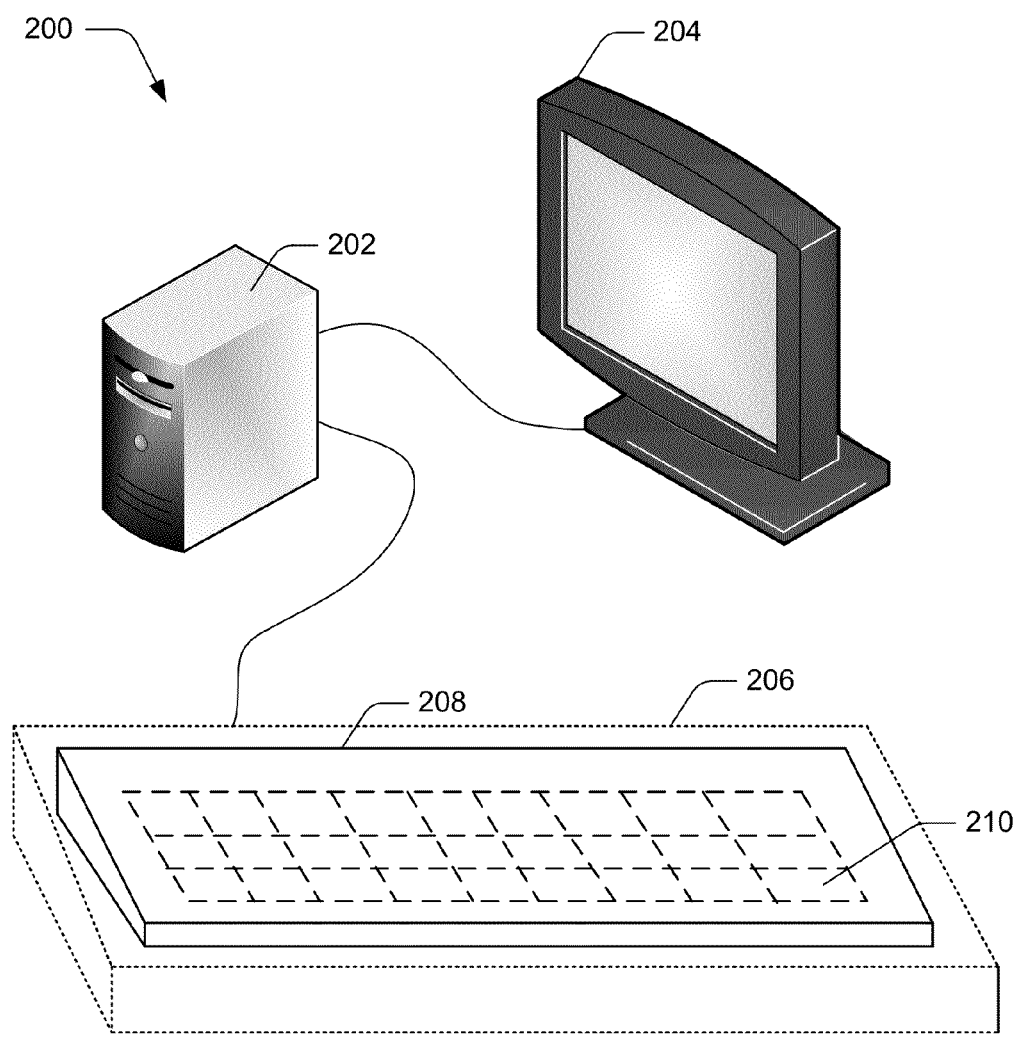
FIG. 2 is an illustration of another environment in an example implementation in accordance with one or more embodiments.

FIG. 2 illustrates another example environment 200 in accordance with one or more embodiments that includes a computing device having a hard drive 202, display device 204 and an adaptive keyboard 206. A wedge light guide is employed in adaptive keyboard 206 and is shown at 208. The adaptive keyboard 206 may be considered as a "computing device" as the term is used herein. The wedge light guide 208 is configured to provide individual images to one or more keys 210 of the adaptive keyboard 206.

The adaptive keyboard 206 may include an LCD panel (not shown) positioned between the wedge light guide 208 and the keys 210 of the keyboard. Further, the adaptive keyboard 206 may include a collimated backlighting system (not shown) configured to provide parallel light to the LCD panel. In this manner, the LCD panel may be controlled to display desired images on each individual key of the keyboard, and may allow the characters/symbols/images/etc. displayed on each keyboard key to be modified for different use environments, such as different character sets, different software programs, etc.

Having considered example environments that can include wedge light guides, consider the following discussion of how wedge light guides can be formed in accordance with one or more embodiments.

Forming Wedge Light Guides

In the discussion that follows, formation techniques are described in which a wedge light guide is formed contemporaneously with its associated optical concentrators to provide a monolithic, integrated structure. Any suitable formation techniques can be utilized for contemporaneously forming the wedge light guide and its associated optical concentrators, without departing from the spirit and scope of the claimed subject matter. In the discussion that follows, a fluidic formation material is utilized and is cast in a manner that forms the wedge light guide and optical concentrators together as an integrated unit. Thus, processing efficiencies are gained by forming the wedge light guide and optical concentrators at the same time, using the same material and apparatus.

Figure 3:
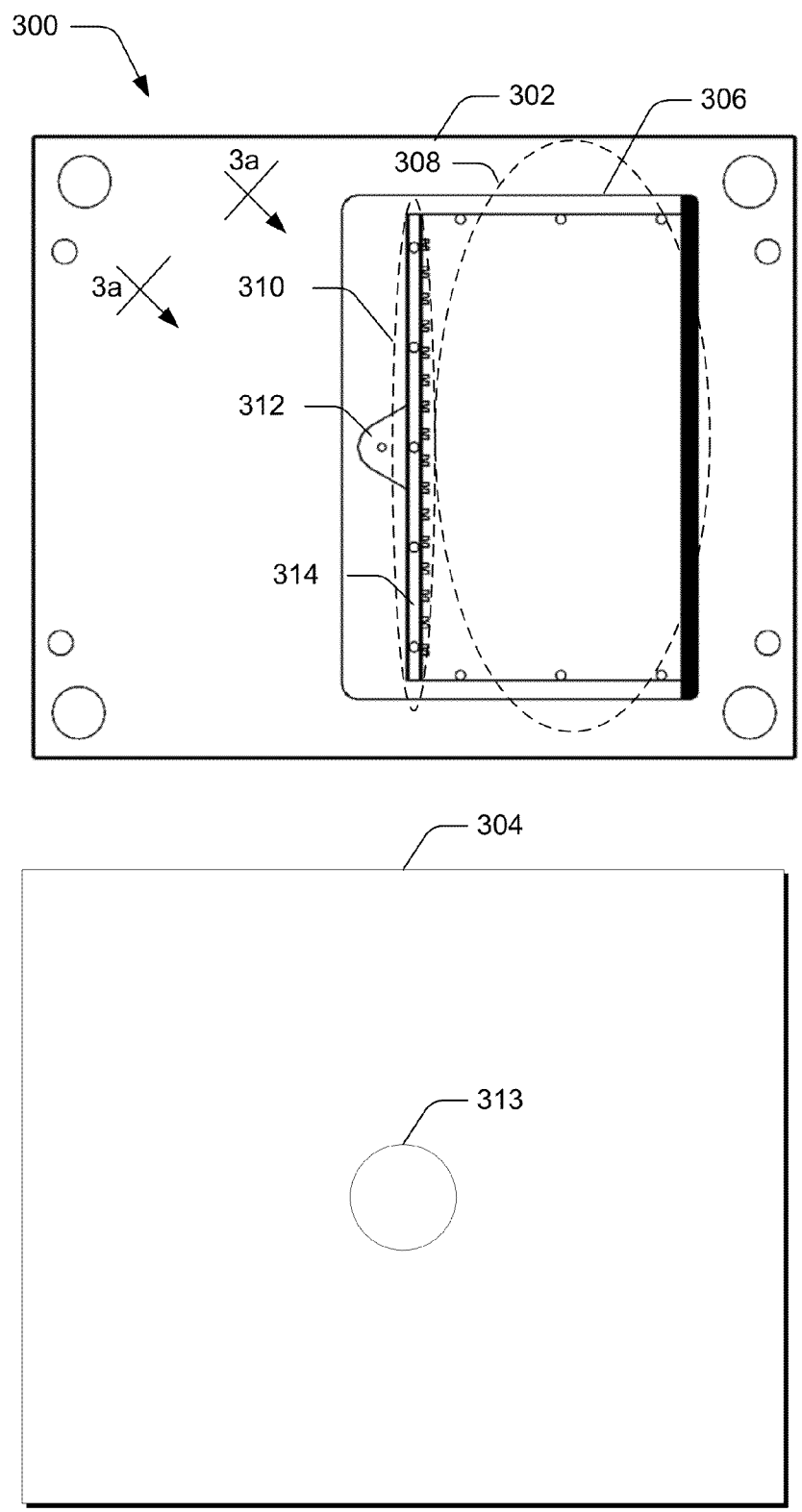
FIG. 3 is a top plan view of an example mold in accordance with one or more embodiments.

FIG. 3 illustrates a diagrammatic representation of a mold, generally at 300, that can be utilized to form a wedge light guide in accordance with one or more embodiments. The mold 300 includes mold halves 302, 304 which fit together so that a wedge light guide can be injection molded as described below. It is to be appreciated and understood that any suitably-configured mold can be utilized. Mold 300 is configured to be utilized in conjunction with an injection molding machine as will be appreciated by those of skill in the art.

Mold half 302 includes a mold cavity 306 that defines a portion of the wedge light guide that is to be formed. In the illustrated example, mold cavity 306 includes a light guide portion 308 and an optical concentrator portion 310 (which is described in more detail in FIG. 3a). The mold half 302 also includes a sprue 312 and a runner 314 to facilitate distribution of the fluidic formation material within the mold. Mold half 304 includes a port 313 which, when the halves are joined together, enables fluidic material to be injected by the injection molding machine through the port 313, into sprue 312 and runner 314 as described below.

In one or more embodiments, the light guide portion 308 and optical concentrator portion 310 are integrally, operatively joined within mold cavity 306 such that when a fluidic formation material is injected into the mold, the resultant wedge light guide that is formed defines a monolithic wedge light guide structure that includes optical concentrators that are integral with the wedge light guide. This constitutes a departure from previous approaches that formed the optical concentrators separately from the wedge light guide, and subsequently mounted or otherwise affixed the optical concentrators to the wedge light guide.

It is to be appreciated and understood that the illustration of FIG. 3 constitutes a diagrammatic representation of the mold that is utilized to form a monolithic wedge light guide. Any suitably-configured mold can be utilized without departing from the spirit and scope of the claimed subject matter.

In at least some embodiments, structure within the mold that defines the optical concentrators can be utilized as ports through which formation material is injected into the remaining portion of the mold. In these embodiments, using the optical concentrator-defining structure within the mold as a port enables uniform flow of formation material and can eliminate so-called secondary parts and improve optical quality of the resultant wedge light guide.

Figure 3A:
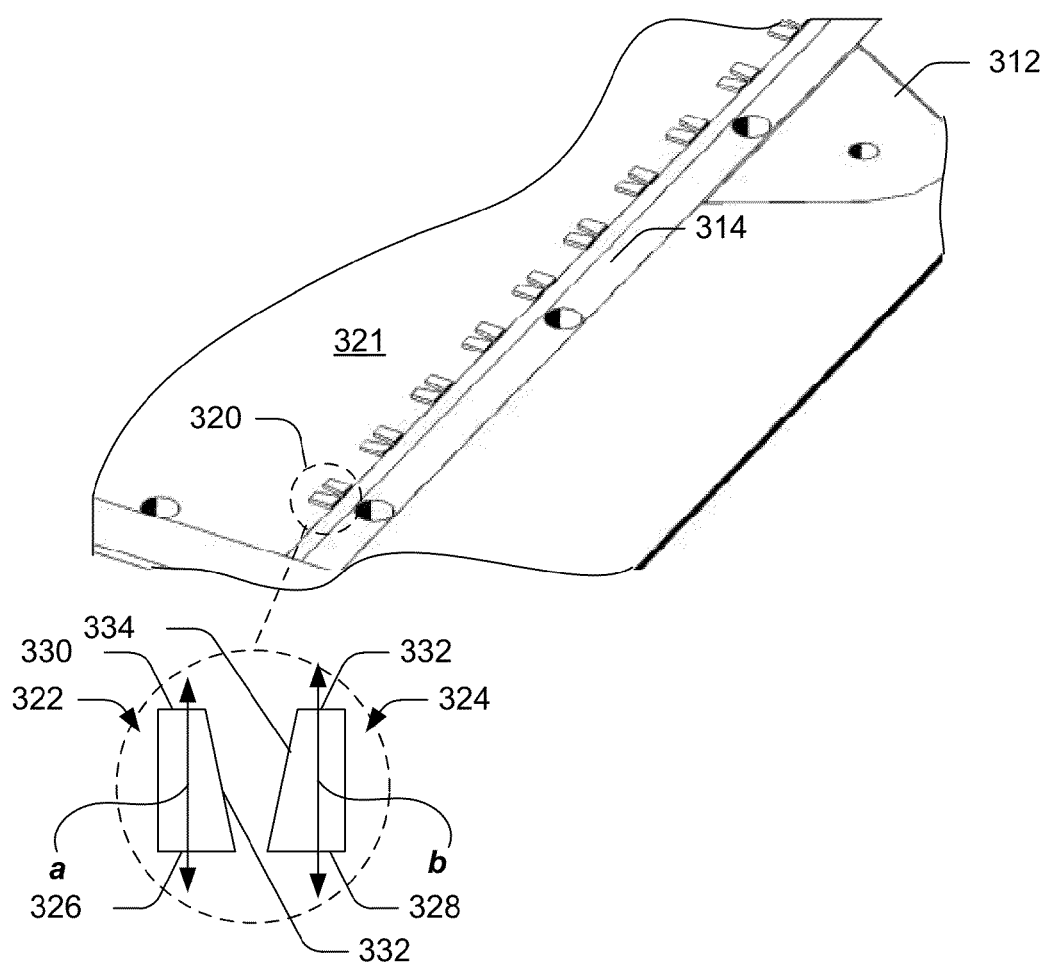
FIG. 3a is an isometric view of a portion of the FIG. 3 mold taken along line 3a-3a in FIG. 3.

FIG. 3a, taken along line 3a-3a in FIG. 3, illustrates the mold structure that defines the optical concentrators within mold 300 in more detail. Sprue 312 and runner 314 are in fluidic communication such that injected formation material can flow within runner 314 and be injected through a plurality of pairs optical concentrator-defining structures, one pair of which is shown at 320. The pairs of optical concentrator-defining structures are mounted on an interior surface 321 of the mold and extend orthogonally away from surface 321. An enlarged top plan view of pair 320 is shown just below the isometric view of FIG. 3a. There, individual structure portions 322, 324 of the pair 320 are shown. In this particular example, each of the individual structure portions 322, 324 comprises a rectilinear structure having, respectively, bases 326, 328 and bodies that extend away from the bases along respective axes a, b, toward respective tops 330, 332. The bases 326, 328 are disposed adjacent runner 314, and the tops 330, 332 are disposed away from runner 314. Each individual structure portion 322, 324 has an interior wall 332, 334 respectively. The interior walls 332, 334 face inwardly to define a volume therebetween through which fluidic formation material is injected. In the illustrated and described embodiment, the interior walls 332, 334 define a first width therebetween adjacent runner 314 and a second width between respective tops 330, 332 which is different from the first width. In the illustrated and described example, the first width is narrower than the second width by virtue of the fact that the interior walls 332, 334 taper away from each other as the walls approach their respective tops. Such geometry defines the optical concentrators for the wedge light guide, as described below.

Figure 4:
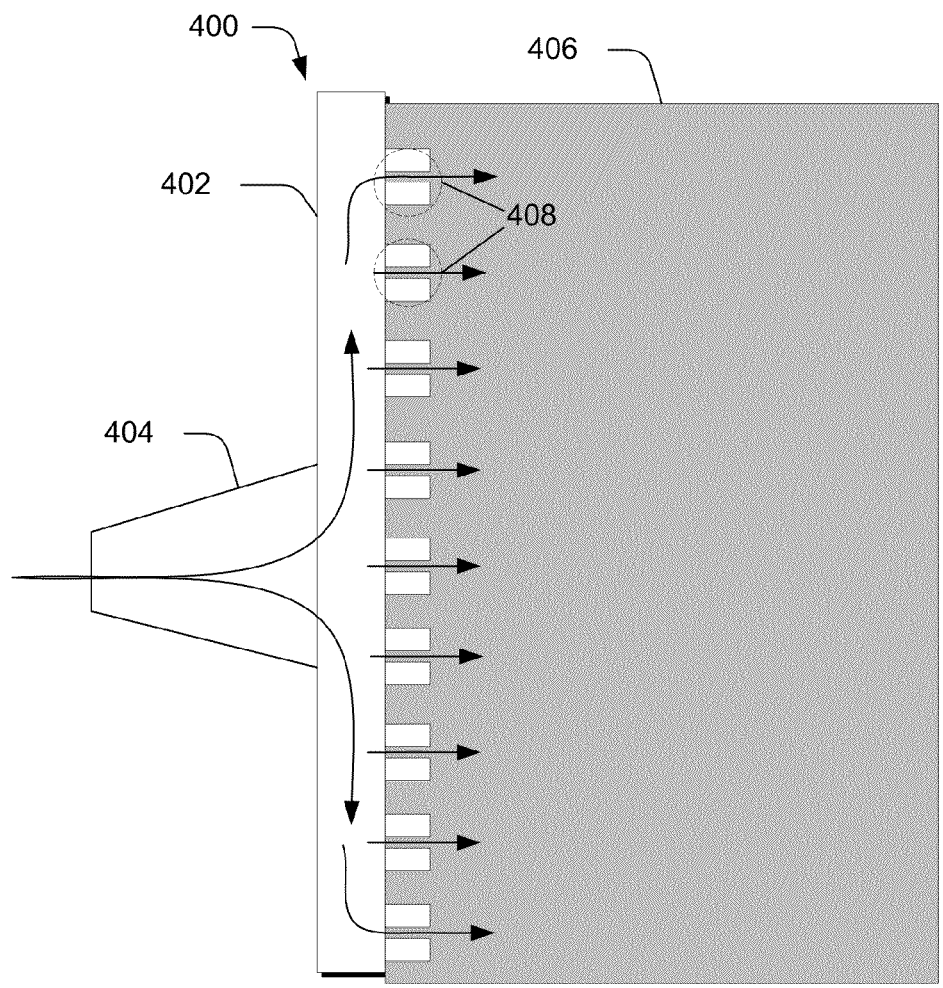
FIG. 4 illustrates an example molding technique in which a wedge light guide can be formed in accordance with one or more embodiments.

As an example, consider FIG. 4 which diagrammatically illustrates, generally at 400, one way in which structure of the mold that defines the optical concentrators can be utilized as injection ports for formation material.

Specifically, in this example, runner 402 is connected to sprue 404 and constitutes injection molding structure through which formation material is injected into an associated mold, generally depicted at 406. Runner 402 and sprue 404 do not comprise part of the wedge light guide. Rather, these components are part of an injection molding machine (not specifically shown) that is utilized to form the wedge light guide described below.

Notice in this example, that a plurality of pairs of optical concentrator-defining structures are disposed along the left side of mold 406, two of which being shown at 408. The pairs of optical concentrator-defining structures are in operative communication with runner 402, as noted above, such that as formation material is injected through the sprue 404 and into runner 402, the formation material spreads out within the runner 402 in the direction of the arrows shown therein. The formation material then flows into the mold 406 through the pairs of optical concentrator-defining structures within the mold. Any suitable material can be utilized as a formation material. Such material can include, by way of example and not limitation, acrylic material (e.g., transparent acrylic material), optical grade PMMA or optical plastics such as Polycarbonates, COCs, Polyesters, CoPolyesters, Styrenes, and the like. In addition, any suitable processing conditions can be utilized to form a resultant wedge light guide.

In one or more embodiments, the following processing conditions can be utilized to form a suitably-configured, monolithic wedge light guide from a transparent acrylic material.

| | |
|---|---|
| Barrel Heat | 500 degrees F. |
| Mold Heat | 200 degrees (both halves) |
| Fill Time | 0.96 seconds |
| Hold Time | 18.92 seconds |
| Fill Pressure | 17,900 psi |
| Hold Pressure | 15,000 psi |
| Back Pressure | 64 psi |
| Cure Time | 45 seconds |

Having considered example formation techniques, consider now an example wedge light guide that has been formed in accordance with the above-described techniques.

Example Wedge Light Guide

Figure 5:
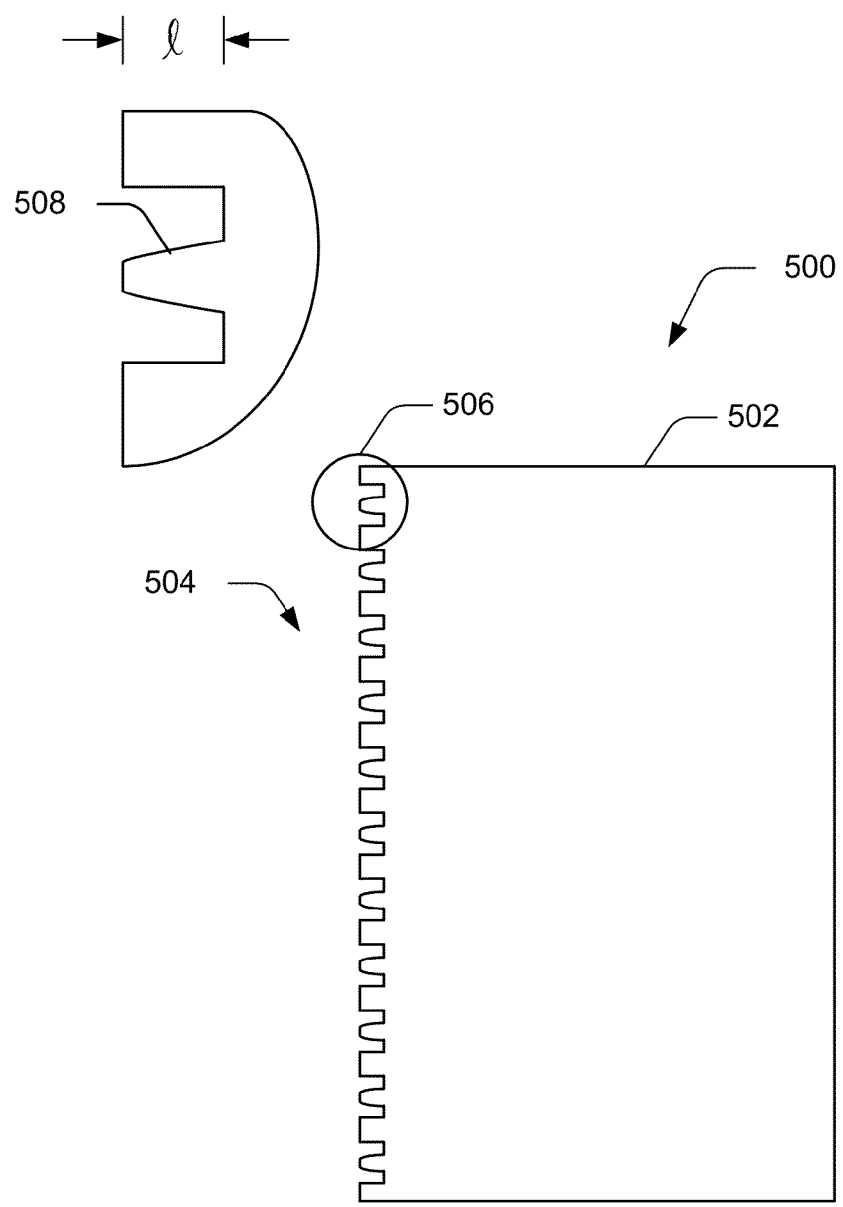
FIG. 5 illustrates an example wedge light guide in accordance with one or more embodiments.

FIG. 5 illustrates an example monolithic wedge light guide generally at 500. The wedge light guide includes a wedge body 502 and a plurality of integrally-formed, injection-molded optical concentrators shown generally at 504 along the left side of the wedge light guide. Optical concentrators can be either solid or hollow, although in most applications the optical concentrators are solid.

The wedge light guide 500 can have any suitable dimensions. These dimensions can, and do vary as between different applications and operational environments, as will be appreciated by the skilled artisan. Accordingly, for the sake of brevity, such varying configurations are not described herein.

An area encircled at 506 includes a single, isolated optical concentrator which is shown, in an enlarged form, just to the upper left of the illustrated wedge light guide 500. There, an individual optical concentrator 508 is shown. The illustrated optical concentrator 508, and its companion optical concentrators, can have any suitable dimensions. In one or more embodiments, the length l of the optical concentrator can be from between about 3.0-20 mm. It is to be appreciated and understood, however, that any suitable dimensions can be utilized without departing from the spirit and scope of the claimed subject matter. In the present example, the optical concentrator 508 tapers inwardly from an end closest to wedge body 502 toward a distal end or terminus. Any suitably-defined optical concentrator geometry can be utilized without departing from the spirit and scope of the claimed subject matter.

Having considered example formation techniques and a resultant monolithic wedge light guide, consider now an example formation method in accordance with one or more embodiments.

Example Method

Figure 6:
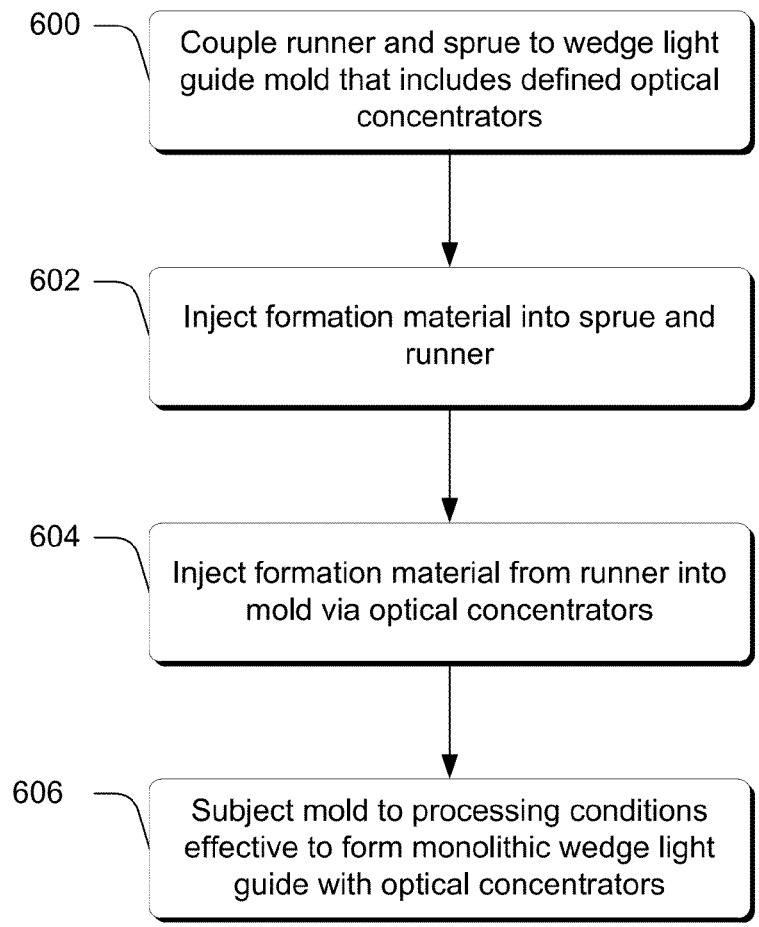
FIG. 6 is a flow diagram that illustrates an example method in accordance with one or more embodiments.

FIG. 6 is a flow diagram that describes an example method in accordance with one or more embodiments. The method can be implemented utilizing any suitable techniques and/or material. In one or more embodiments, the flow diagram describes an injection molding technique that can be utilized to form a monolithic, wedge light guide having integrally-joined optical concentrators.

Step 600 couples a runner and sprue to a wedge light guide mold that includes defined optical concentrators. Specifically, the mold defines not only a mold body but also optical concentrators that are to be integrally formed with the mold body. Step 602 injects formation material into the sprue and runner. Any suitable injection molding techniques can be utilized. In addition, any suitable formation material can be utilized, examples of which are provided above.

Step 604 injects formation material from the runner into the mold via the defined optical concentrators. Step 606 subjects the mold to processing conditions effective to form a monolithic wedge light guide with integrally-formed optical concentrators. Example processing conditions are described above.

Conclusion

In one or more embodiments, wedge light guides are constructed that are monolithic in nature and include integrally-formed optical concentrators. The wedge light guide and its associated optical concentrators are defined by a mold. In at least some embodiments, structure within the mold that defines the optical concentrators can be used as injection ports through which formation material can be injected to form the monolithic wedge light guide. Constructing wedge light guides as described below can allow for the uniform flow of formation material and reduce or eliminate secondary parts while, at the same time, improving optical quality of the wedge light guide.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. An apparatus comprising:
a wedge light guide comprising:
a wedge body; and
a plurality of integrally-formed optical concentrators through which light can be injected into the wedge body, said wedge body and optical concentrators defining a monolithic structure, said wedge body and optical concentrators being made of a same material having a uniformity that results from injection of the same material into the wedge body via the optical concentrators during formation of the wedge light guide.

2. The apparatus of claim 1, wherein the same material comprises an injection-molded material.

3. The apparatus of claim 1, wherein the same material comprises an injection-molded transparent acrylic material.

4. The apparatus of claim 1, wherein individual optical concentrators have individual respective lengths from between about 3.0 mm to 20 mm.

5. The apparatus of claim 1, wherein individual optical concentrators taper inwardly from a respective end closest to the wedge body toward a respective distal end.

6. The apparatus of claim 1, embodied in a surface computing device.

7. The apparatus of claim 1, embodied in a backlight system.

8. The apparatus of claim 1, embodied in a computing device.

9. The apparatus of claim 1, embodied in an adaptive keyboard.

10. An apparatus comprising:
a surface computing device including a wedge light guide and a display surface positioned operably adjacent the wedge light guide;
the wedge light guide comprising:
a wedge body; and
a plurality of integrally-formed optical concentrators through which light can be injected into the wedge body, said wedge body and optical concentrators defining a monolithic structure, said wedge body and optical concentrators being made of a same material having a uniformity that results from injection of the same material into the wedge body via the optical concentrators during formation of the wedge light guide;
the display surface comprising a liquid crystal display (LCD) panel configured to provide an image to the display surface.

11. The apparatus of claim 10, wherein the wedge light guide has a thick end and a thin end, and wherein the optical concentrators are located at the thick end of the wedge light guide.

12. The apparatus of claim 10, wherein the wedge light guide has a thick end and a thin end, and wherein the optical concentrators are located at the thin end of the wedge light guide.

13. The apparatus of claim 10 further comprising a backlight system comprising one or more light sources for the wedge light guide.

14. The apparatus of claim 10 further comprising a vision-based, touch detection system comprising a camera configured to detect light associated with touch on the display surface.

15. The apparatus of claim 10 further comprising a controller having a logic subsystem, a data holding subsystem, and an input/output port;
the logic subsystem including one or more processors configured to execute software instructions;
the data holding subsystem being configured to hold data and instructions executable by the logic subsystem; and
the input/output port being configured for connection to a backlight system.

16. An apparatus comprising:
a computing device including a wedge light guide and a display surface positioned operably adjacent the wedge light guide;
the wedge light guide comprising:
a wedge body; and
a plurality of integrally-formed optical concentrators through which light can be injected into the wedge body, said wedge body and optical concentrators defining a monolithic structure, said wedge body and optical concentrators being made of a same material having a uniformity that results from injection of the same material into the wedge body via the optical concentrators during formation of the wedge light guide, wherein individual optical concentrators taper inwardly from a respective end closest to the wedge body toward a respective distal end;
the display surface comprising a liquid crystal display (LCD) panel configured to provide an image to the display surface.

17. The apparatus of claim 16, wherein the same material comprises a transparent acrylic material.

18. The apparatus of claim 16, wherein individual optical concentrators have individual respective lengths from between about 3.0 mm to 20 mm.

19. The apparatus of claim 16 further comprising a keyboard having a plurality of keys, and wherein the LCD panel is positioned between the wedge light guide and the keys of the keyboard.

20. The apparatus of claim 16, wherein the optical concentrators of the plurality of integrally-formed optical concentrators are located along at least one end of the wedge light guide in a spaced-apart arrangement.

* * * * *